July 19, 1927.
C. H. MEEKER
1,636,525
REENFORCED MOVING PICTURE FILM
Filed June 9, 1924
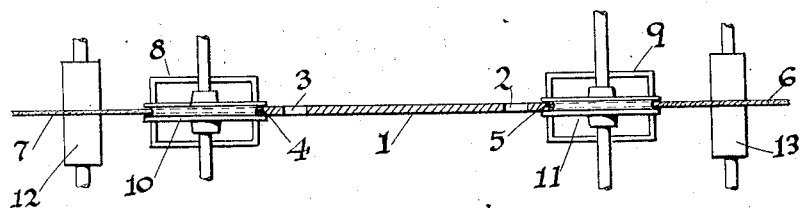
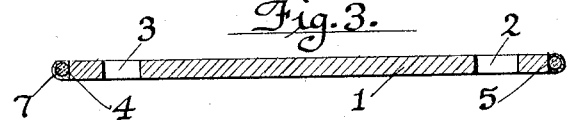
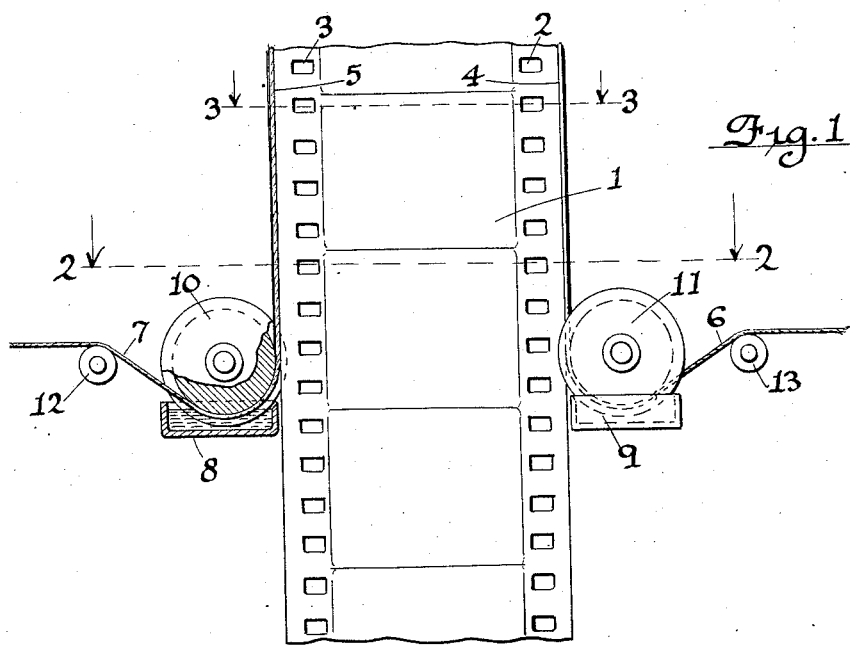
Inventor
Charles H. Meeker
By Hazard and Miller
Attorneys
Witness:
W. F. Hall Patented July 19, 1927.

1,636,525

UNITED STATES PATENT OFFICE.

CHARLES H. MEEKER, OF RIVERSIDE, CALIFORNIA.

REENFORCED MOVING-PICTURE FILM.

Application filed June 9, 1924. Serial No. 718,800.

This invention consists of the novel features herein shown, described and claimed.

The leading object is to saturate threads with a solution of celluloid and apply the saturated threads to the edges of films so that the threads will be bonded to and become a part of the films.

Another object is to apply silk threads, or the like, along the edges of a moving picture film outside of the sprocket holes to prevent the films from breaking from the sprocket holes outwardly.

Another object is to make a moving picture film having reenforcing threads incorporated along its edges to strengthen the material from the sprocket holes outwardly.

Other objects and advantages will appear from the drawings and specification. The drawings illustrate a reenforced moving picture film embodying the principles of the invention, and suggest a method and apparatus for applying the reenforcements to the film.

Figure 1 is a fragmentary elevation of a reenforced film and showing conventionally or diagrammatically one way of applying the reenforcements to the film.

Fig. 2 is a horizontal cross section on the line 2—2 of Fig. 1 and looking downwardly as indicated by the arrows.

Fig. 3 is a horizontal cross section on an enlarged scale and on the line 3—3 of Fig. 1, and looking downwardly as indicated by the arrows.

The details of construction of the reenforced film shown in the drawings and the details of applying the reenforcements as shown in the drawings, are as follows:

The moving picture film 1 has sprocket holes 2 and 3 running in lines evenly spaced apart and near the edges 4 and 5 of the film. It constantly happens as the films are used over and over that the films break outwardly from the sprocket holes, and to overcome this defect is the object of this invention, and the invention consists of applying fine silk threads 6 and 7, or the like, against the edges 4 and 5 and bonding the threads to the body of the film so that the threads become a part of the film and strengthen the material from the sprocket holes outwardly.

The reenforcements may be applied as follows:

Pans 8 and 9 are mounted adjacent the edges of the film 1 and filled to any desired extent with a quick drying solution of celluloid which may be anywhere from 5% to 20% celluloid. Grooved wheels 10 and 11 are mounted above the pans 8 and 9 in position to dip into the solutions in the pans. The threads 5 and 6 are mounted to run over guide rollers 12 and 13 under the grooved wheels 10 and 11 into the solutions in the pans 8 and 9 and upwardly against the edges 4 and 5 of the film 1. The threads will become saturated with the celluloid solution and will be pressed firmly against the edges of the film and the solution will harden and bond with the body of the film and hold the threads securely in place as a part of the film.

If found desirable, the film may be run flatwise between rollers after the threads are applied before the solution is fully set so as to reduce the slight thickening of the extreme edges of the film, otherwise incident to the process as described.

The apparatus for applying the reenforements is only suggestive and is not a part of the present invention.

In cases where applying the threads to the film will make the ultimate film too wide, the film may be trimmed or made narrower before the threads are applied. In making new films the reenforcing threads might be incorporated into the edges of the films as the films are made, instead of being separately applied after the films are made.

Thus I have produced a reenforced moving picture film having threads incorporated into the film or applied to the edges of the film outside of the sprocket holes and to reenforce the material from the sprocket holes outwardly.

Various changes may be made without departing from the spirit of the invention as claimed.

I claim:

1. A moving picture film in combination with a reenforcing border therefor, said border including a reenforcing longitudinal member secured solely to the edge of said film and in the plane of the film.

2. A moving picture film in combination with a reenforcing border therefor, said border including a reenforcing longitudinal member secured solely to the edge of said film and in the plane thereof, said film and said border being of substantially uniform thickness.

3. A moving picture film in combination with a reenforcing border therefor, said border including a thread secured to the edge of said film and in the plane of the film.

4. A moving picture film in combination with a reenforcing border therefor, said border including a thread impregnated with an adhesive binder and secured to the edge of said film and parallel to the direction of the length thereof.

5. A moving picture film in combination with a reenforcing border therefor, said border including a thread impregnated with cellulose ester and secured to the edge of said film and parallel to the direction of the length thereof.

6. A moving picture film in combination with a reenforcing border therefor, said border including a silk thread impregnated with a cellulose solution and secured to the edge of said film and parallel to the direction of the length thereof.

7. A motion picture film having reenforcements mounted along its edges and in the plane of the film, said reenforcements being of such size and so arranged that they do not substantially increase the thickness through the film.

In testimony whereof I have signed my name to this specification.

C. H. MEEKER.